United States Patent
Altonen et al.

(10) Patent No.: US 10,714,919 B2
(45) Date of Patent: Jul. 14, 2020

(54) WALLBOX INSTALLATION TOOL

(71) Applicant: Lutron Technology Company LLC, Coopersburg, PA (US)

(72) Inventors: Gregory S. Altonen, Easton, PA (US); Adam Andersen, Allentown, PA (US); Xavier Boudin, London (GB); Michel Hanns, London (GB); Eric Johnathan Mace, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/887,150

(22) Filed: Feb. 2, 2018

(65) Prior Publication Data

US 2018/0219364 A1 Aug. 2, 2018

Related U.S. Application Data

(60) Provisional application No. 62/503,086, filed on May 8, 2017, provisional application No. 62/453,796, filed on Feb. 2, 2017.

(51) Int. Cl.
*H02G 3/08* (2006.01)
*H02G 3/10* (2006.01)
(Continued)

(52) U.S. Cl.
CPC ............... *H02G 3/10* (2013.01); *B25H 7/02* (2013.01); *H02G 3/00* (2013.01); *H02G 3/086* (2013.01); *H02G 2200/30* (2013.01)

(58) Field of Classification Search
CPC ............................... H02G 3/10; H02G 3/288
See application file for complete search history.

(56) References Cited

U.S. PATENT DOCUMENTS

| 4,295,180 A | * | 10/1981 | Herron | ................ | H05K 5/0017 |
| | | | | | 236/94 |
| 4,793,069 A | | 12/1988 | McDowell | | |
| 5,107,918 A | * | 4/1992 | McFarlane | ......... | G05D 23/1917 |
| | | | | | 165/238 |

(Continued)

FOREIGN PATENT DOCUMENTS

| DE | 102009050677 A1 | 4/2011 |
| DE | 102014006554 B3 | 10/2015 |
| GB | 2516508 A | 1/2015 |

OTHER PUBLICATIONS

Legrand, Batibox Boxes Technical Data Sheet #F00447EN/01, Mar. 27, 2013, 3 sheets.

*Primary Examiner* — Hung V Ngo
(74) *Attorney, Agent, or Firm* — Philip Smith; Glen Farbanish; Amy Yanek

(57) ABSTRACT

As described herein, a wall box installation tool may include a template body, one or more hollow pegs, a guide ring, and/or one or more template cards. The template cards may be configured to be installed on a front surface of the template body. A template card may define a plurality of holes therethrough. The guide ring may be configured to be installed within a pre-drilled hole in a wall. Each template card may be associated with a respective electrical device configuration. A subset of bores extending through the hollow pegs may be accessible via the template card when the template card is installed on the front surface of the template body. The wall box installation tool may include one or more fasteners that are configured to install a template card onto the front surface of the template body.

25 Claims, 10 Drawing Sheets

(51) Int. Cl.
 *B25H 7/02* (2006.01)
 *H02G 3/00* (2006.01)

(56) References Cited

U.S. PATENT DOCUMENTS

| | | | | |
|---|---|---|---|---|
| 5,434,378 A * | 7/1995 | McLean | ............... | H01H 3/20 200/43.11 |
| 5,542,757 A * | 8/1996 | Chang | ............... | G11B 33/02 312/213 |
| 5,770,817 A * | 6/1998 | Lo | ............... | H02G 3/086 174/53 |
| 6,300,727 B1 * | 10/2001 | Bryde | ............... | H05B 37/0263 315/292 |
| 6,459,250 B1 * | 10/2002 | Davis | ............... | H05B 39/08 174/66 |
| 6,616,005 B1 * | 9/2003 | Pereira | ............... | H01R 13/514 174/66 |
| 6,842,993 B1 | 1/2005 | DiMauro | | |
| 6,980,421 B2 * | 12/2005 | Shih-Tsung | ............... | G06F 1/181 312/223.2 |
| 8,350,984 B2 * | 1/2013 | Perry | ............... | H05K 5/03 349/56 |
| 8,690,074 B2 * | 4/2014 | Moore | ............... | G05D 23/1917 236/94 |
| 8,901,417 B2 * | 12/2014 | Herring | ............... | H05K 5/0217 174/50 |
| 9,310,095 B2 * | 4/2016 | Adamik | ............... | F24F 11/30 |
| 2007/0291469 A1 * | 12/2007 | Chen | ............... | H01H 9/181 362/95 |
| 2016/0307714 A1 * | 10/2016 | Bhate | ............... | H01H 13/83 |
| 2017/0025835 A1 * | 1/2017 | Johnson | ............... | H02G 3/083 |
| 2017/0279257 A1 * | 9/2017 | Wurtz | ............... | H02G 3/086 |

* cited by examiner

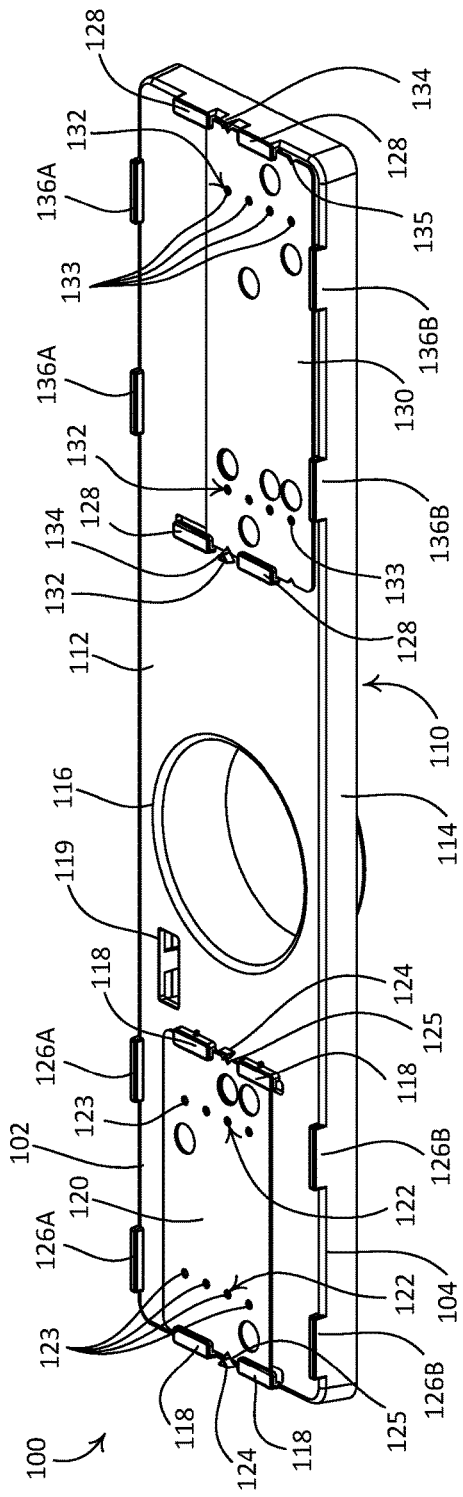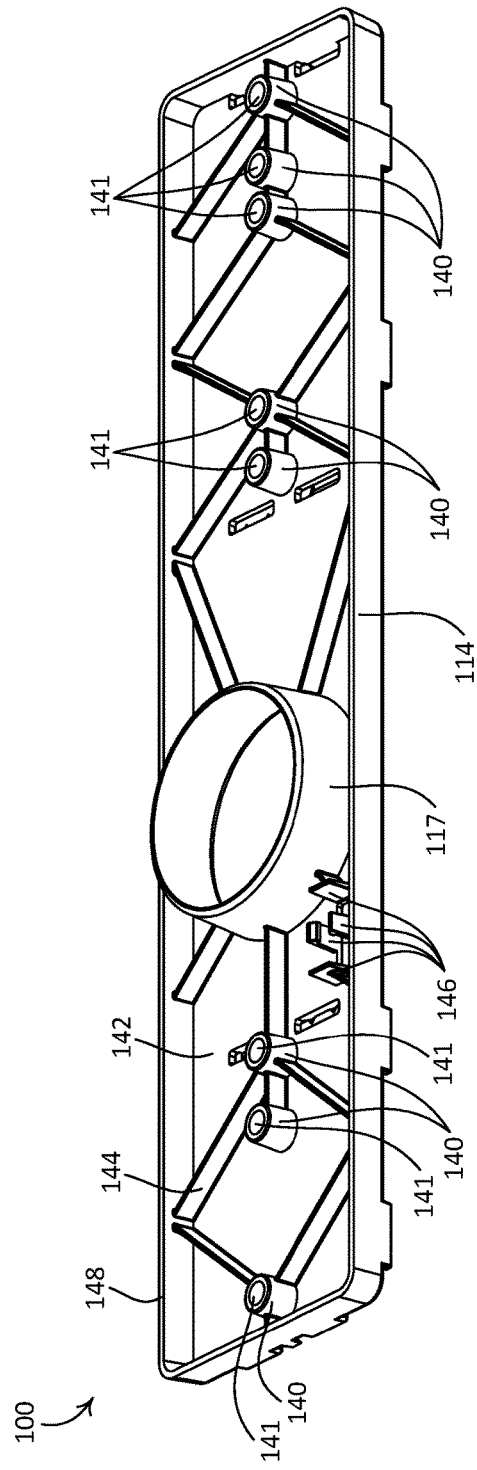
FIG. 1A
FIG. 1B

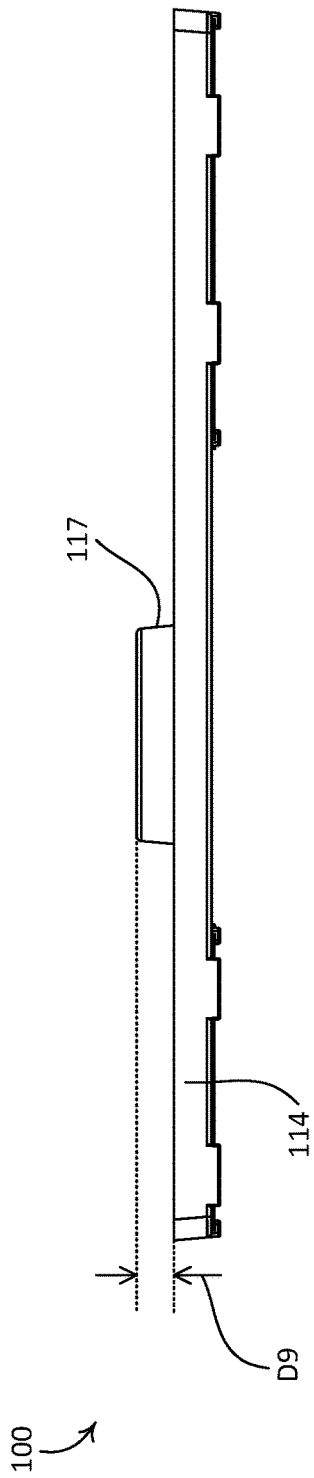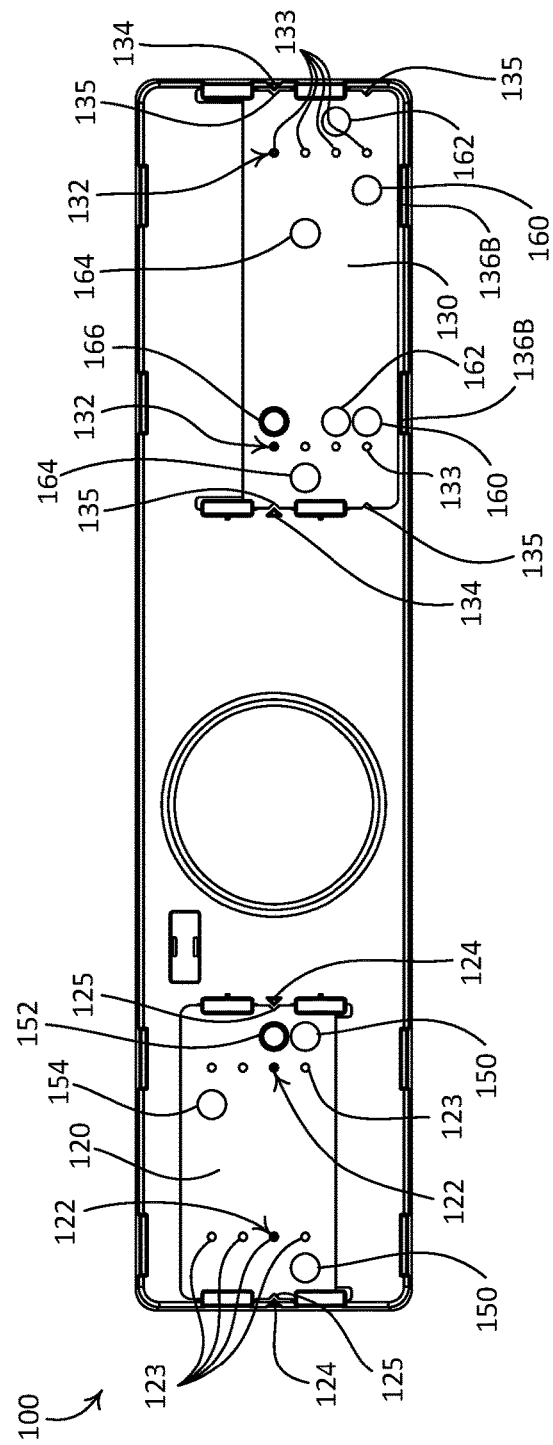

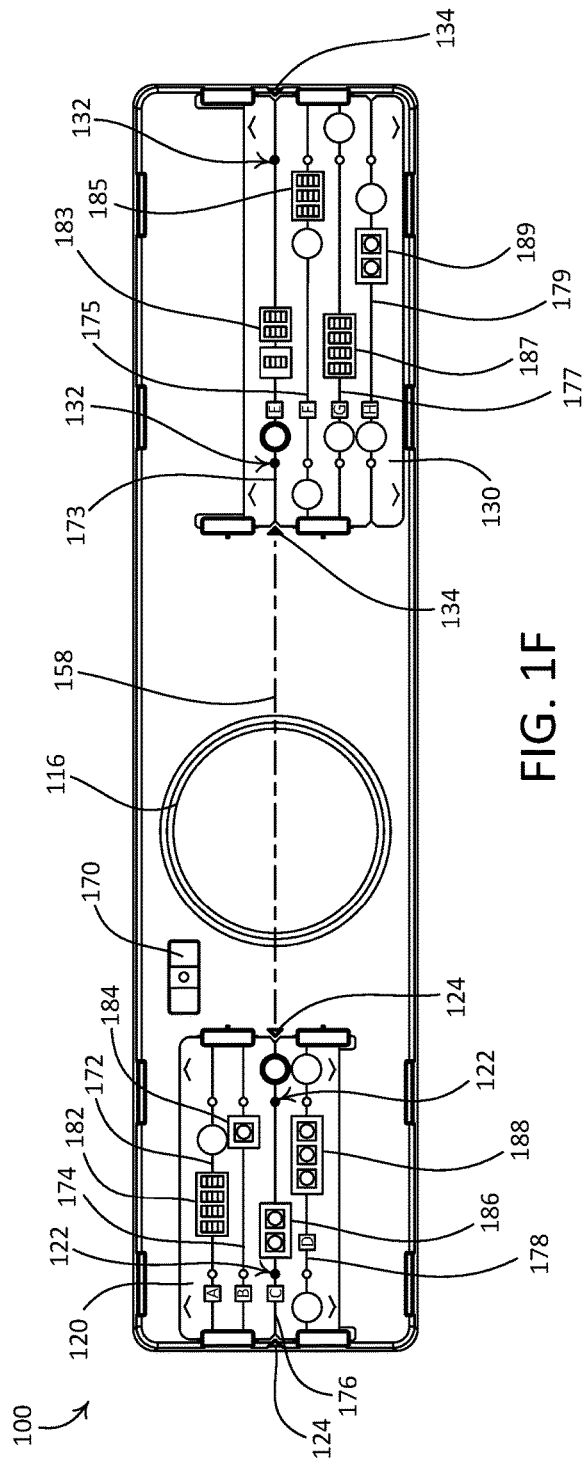
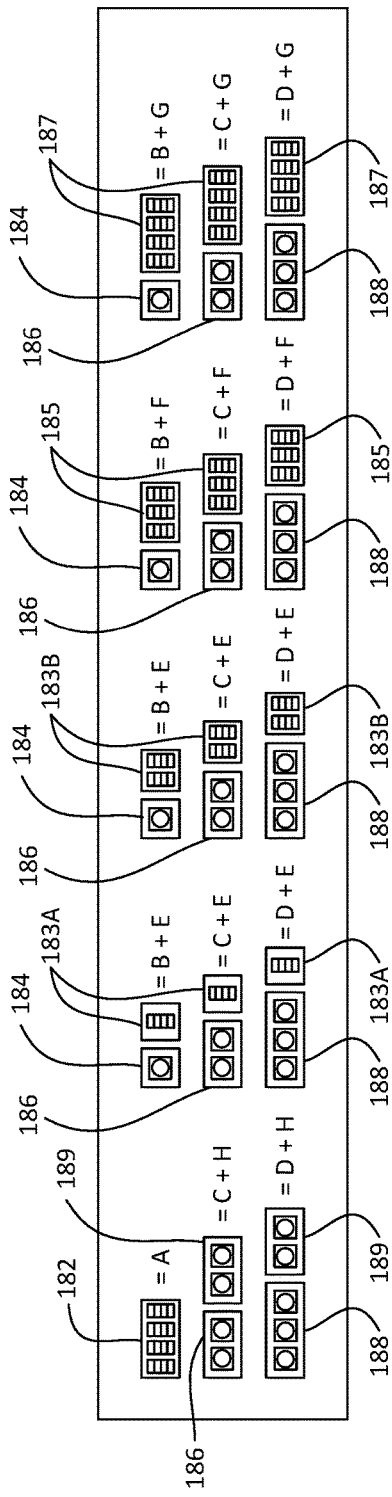
FIG. 1F
FIG. 1G

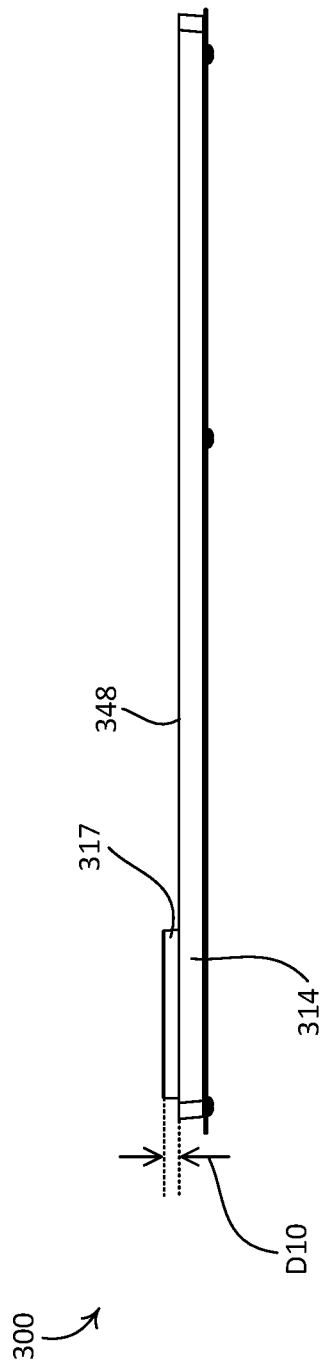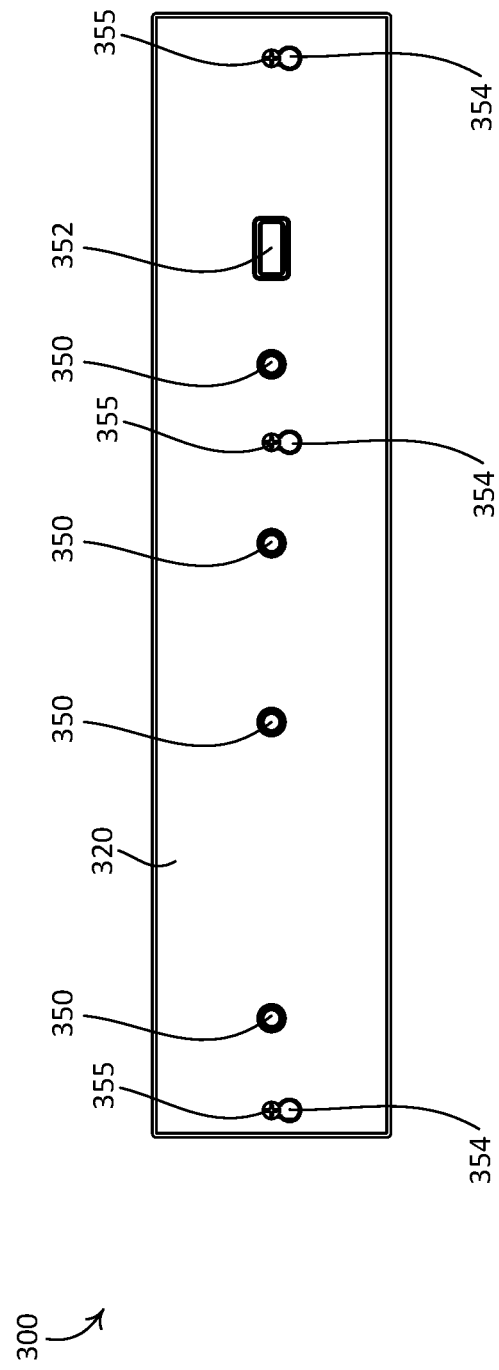
FIG. 3D
FIG. 3E

WALLBOX INSTALLATION TOOL

CROSS-REFERENCE TO RELATED APPLICATIONS

This application claims the benefit of U.S. Provisional Patent Application No. 62/453,796, filed Feb. 2, 2017, and U.S. Provisional Patent Application No. 62/503,086, filed May 8, 2017, the entire disclosures of which are hereby incorporated by reference.

BACKGROUND

Electrical wall boxes are well known. A typical electrical wall box includes a housing that is installed within a wall. An electrical wall box is typically configured to receive at least one electrical device, such as a switch or a receptacle, for example. A typical electrical wall box is also configured to receive a wall plate. The wall plate may be adapted to cover a yoke plate and/or escutcheon of the electrical devices mounted within the wall box. The wall plate may be configured to be attached to the electrical device with or without fasteners.

An electrical wall box may be configured to receive a single electrical device or multiple electrical devices. An electrical wall box that is configured to receive multiple electrical devices may be referred to as a multi-gang wall box. Different types of electrical devices, e.g., devices of varying size, may be installed in a multi-gang wall box. Different electrical devices may have different mounting requirements, such as different fastener locations and/or sizes, for example. And, though some electrical devices may be installed in a single wall box with other types of electrical devices, certain electrical devices may not be installable in the same wall box with other types of electrical devices. Furthermore, multiple wall boxes may be installed in close proximity to each other, e.g., directly next to each other.

A typical wall box installation tool includes a template used for locating a wall box. Typical wall box installation tools provide for the installation of a single multi-gang wall box (e.g., a two- to four-gang wall box), but do not allow for the installation of non-standard wall boxes as well as locating and aligning multiple adjacent wall boxes.

SUMMARY

As described herein, a wall box installation tool may facilitate the installation of one or more wall boxes for mounting electrical devices to a wall. The wall box installation tool may be configured to aide in the marking and/or drilling of pilot holes required for installing the wall boxes. The wall box installation tool may be used to install one or more multi-gang wall boxes that have either standard or non-standard spacing between gangs. The wall box installation tool may help with achieving the appropriate spacing between and alignment of adjacent wall boxes. The wall box installation tool may be configurable to allow for the installation of wall boxes for electrical devices having different sizes and/or configurations, for different numbers of electrical devices (e.g., different number of gangs), and/or for different spacings between electrical devices and/or other wall boxes.

The wall box installation tool may include a template body and a template card. The template body may include a front surface, a guide ring that extends from a rear surface of the template body, and a plurality of bores that extend through the template body from the front surface to the rear surface. The guide ring may be configured to be installed within a pre-drilled hole in a wall. The guide ring may be configured to position the wall box installation tool within a wall.

The template card may be associated with an electrical device configuration of the electrical devices that may be mounted to the wall box. The template card may have a plurality of holes therethrough. When the template card is installed on the front surface of the template body, a subset of the bores in the template body are accessible via the holes of the template card. The template card may be removed from the template body and another template card may be installed on the front surface of the template body. The second template card may have a plurality of holes in different locations than the holes of the first template card, such that a different subset of the bores may be accessible via the holes of the second template card. A number of the plurality of holes of the template card may be less than a number of the plurality of bores of the template body.

The second template card may be held against the front surface of the template body and may be moved on the template body from a first position associated with a first electrical device configuration to a second position associated with a second electrical device configuration. For example, the template card may be slid along the front surface of the template body between the first and second positions. A first subset of the bores may be accessed via the plurality of holes when the template card is in the first position. A second subset of the bores may be accessible via the plurality of holes when the template card is in the second position. The wall box installation tool may comprise two template cards that each may be slid from a first position to a second position. A first subset of bores may be accessible via the first and second template cards in the first position, and a second subset of bores may be accessible via the first and second template cards in the second position. In addition, a third subset of bores may be accessible via the first and second template cards when first template card is in the first position and the second template card is in the second position.

The wall box installation tool may be used to drill one or more pilot holes associated with the configuration of electrical devices that are to be installed in one or more wall boxes. For example, the guide ring of the wall box installation tool may be inserted in a first hole drilled in a wall. The wall box installation tool may include a level that may be used to level the wall box installation tool when installed in the wall. The template card(s) may be adjusted to correspond to various electrical device and/or electrical wall box configurations. For example, if the wall box installation tool has two template cards, the first template card and the second template card may be moved into position based on a selected configuration of electrical devices. One or more pilot holes may be drilled at the locations of the holes and bores associated with the selected positioning. The wall box installation tool may be removed from the wall and one or more second holes (e.g., 68 mm diameter hole) may be drilled at the location of the one or more pilot holes. Remaining wall material between the first hole and the second hole may be removed to allow for installation of one or more wall boxes.

A wall box installation tool that includes a template body, and plurality of levels is also described herein. The template body may have a guide ring and a plurality of bores that extend through the template body. The guide ring may extend from a rear surface of the template body, and may be configured to be installed within a pre-drilled hole in a wall.

The plurality of levels may be positioned at oblique angles on the template body. A first subset of the bores may be aligned with a first level of the plurality of levels, such that the first subset of the bores may be horizontal when the first level is level. A second subset of the bores may be aligned with a second level of the plurality of levels, such that the second subset of the bores may be horizontal when the second level is level

BRIEF DESCRIPTION OF THE DRAWINGS

FIG. 1A is an example wall box installation tool having template cards.

FIG. 1B is rear view of the example wall box installation tool shown in FIG. 1A.

FIGS. 1C-1E are projection views of the example wall box installation tool shown in FIG. 1A FIG. 1F is a front view of the example wall box installation tool of FIG. 1A showing example template card details.

FIG. 1G depicts example wall box configurations that can be installed using the example wall box installation tool shown in FIG. 1A.

FIG. 3D is a side view of the example wall box installation tool shown in FIG. 3A.

FIG. 3E is a front view of the example wall box installation tool of FIG. 3A.

DETAILED DESCRIPTION

Figure 1E:
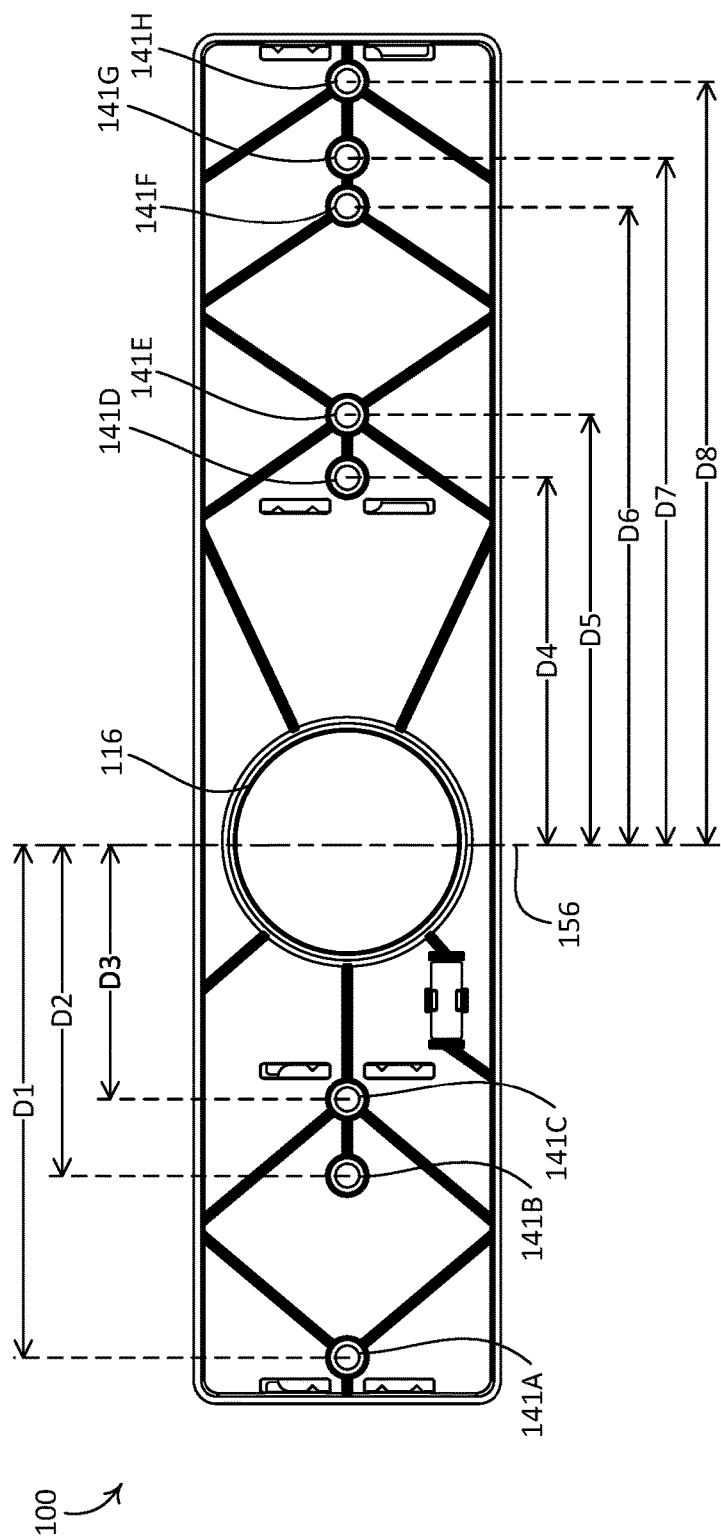

FIGS. 1A-1G depict an example wall box installation tool 100. The example wall box installation tool 100 may allow for alignment and spacing of multiple adjacent wall boxes. The example wall box installation tool 100 may allow for the installation of non-standard wall boxes as well as locating and aligning multiple adjacent wall boxes. For example, the example wall box installation tool 100 may be used as a template for a desired wall box configuration and/or electrical device configuration. An electrical device configuration may include one or more standard and/or non-standard electrical devices installed in a single gang wall box, a multi-gang wall box, and/or multiple wall boxes. The example wall box installation tool 100 may allow for mounting of adjacent wall boxes for standard electrical devices, such as switches and receptacles, and non-standard electrical devices, such as a keypad of a load control system. The example wall box installation tool 100 may be used as a template to mark and/or drill one or more pilot holes for the installation of one or more wall boxes in which standard and/or non-standard electrical devices are to be installed. Example of non-standard electrical devices (such as keypads) are described in greater detail in commonly-assigned U.S. Patent Application Publication No. 2016/0307714, published Oct. 20, 2016, entitled CONTROL DEVICES HAVING INDEPENDENTLY SUSPENDED BUTTONS FOR CONTROLLED ACTUATION, the entire disclosure of which is hereby incorporated by reference.

As shown, the example wall box installation tool 100 may include a template body 110, a first template card 120, and a second template card 130. The template body 110 may define a front surface 112, a rear surface 142, and a rim 114. The front surface 112 may have a rectangular shape. The rim 114 may extend at a perimeter of and substantially perpendicular to the front surface 112. The template body 110 may include a guide ring 117 that extends from the rear surface 142 of the template body 110. The guide ring 117 may extend a distance D9 beyond a bottom edge 148 of the rim 114 (e.g., as shown in FIG. 1C). The guide ring 117 may be sized to correspond to a standard wall box size and/or a standard hole saw. For example, the guide ring 117 may have an outer diameter of 67 mm or 68 mm. Although the guide ring 117 is depicted as having a circular shape, the guide ring 117 may be square-shaped or rectangular-shaped.

The front surface 112 may define an opening 116. The opening 116 may be aligned with the guide ring 117 such that the opening 116 defines the inner diameter of the guide ring 117. The front surface 112 may define an orifice 119. The orifice 119 may be configured to receive a level 170 (e.g., such as a tubular spirit level). The front surface 112 may define one or more additional orifices that are configured to accept one or more additional levels. For example, the front surface 112 may define an orifice to receive an additional level that is oriented perpendicular to the level 170. The template body 110 may include a plurality of fingers 146 that extend from the rear surface 142 of the template body 110 at the edges of the orifice 119. The fingers 146 may be configured to secure the level 170 within the orifice 119. The level 170 may be secured within the orifice 119 such that it can be read via the front surface 112.

The template body 110 may include protrusions 122, 132 (e.g., bumps or nubs) that extend from the front surface 112 of the template body 110. The first protrusions 122 may be received in respective openings 123 in the first template card 120, and the second protrusions 132 may be received in respective openings 133 in the second template card 130. The protrusions 122, 132 may be configured to engage the first template card 120 or the second template card 130 to enable a template selection. The protrusions 122, 132 may be arranged along a horizontal centerline 158 of the guide ring 117. For example, the first template card 120 and the second template card 130 may be moved, independent of one another, to enable the template selection. The template selection may be associated with a wall box and/or electrical device configuration. The protrusions 122 may be configured to hold the first template card 120 in place (e.g., in a selected position) on the front surface 112 of the template body 110. The protrusions 132 may be configured to hold the second template card 130 in place (e.g., in a selected position) on the front surface 112 of the template body 110. When the first and second template cards 120, 130 are moved, the protrusions 122, 132 may exit the respective openings 123, 133, and the template cards may flex slightly to allow the template cards to move over the protrusions until the protrusions are received in another pair of the openings.

The template body 110 may also include a plurality of triangular wedges 124, 134 that extend from the front surface 112 of the template body 110. The first template card 120 may include a plurality of notches 125 on each side of the first template card, and the second template card 130 may include a plurality of notches 135 on each side of the second template card. The triangular wedges 124, 134 may be configured to be received in the notches 125, 135 in the respective template card 120, 130. The triangular wedges 124, 134 may be arranged along the horizontal centerline 158 of the guide ring 117 (e.g., in line with the protrusions 122, 132). The triangular wedges 124, 134 may provide visual cues for aligning the protrusions 122, 132 in the openings 123, 133 of the respective template cards 120, 130 when adjusting the positions of the first template card 120 and/or the second template card 130. The triangular wedges 124, 134 may be also configured to engage the notches 125, 135 of the respective template cards 120, 130 (e.g., to enable the template selection). For example, the triangular wedges 124 may be configured to hold the first template card 120 in place (e.g., in the selected position) on the front surface 112 of the template body 110, and the triangular wedges 134 may be configured to hold the second template card 130 in place (e.g., in the selected position) on the front surface 112 of the template body 110.

The template body 110 may include a plurality of stops 126A, 126B, 136A, 136B at a top edge 102 and a bottom edge 104 of the template body 110. The stops 126A, 126B may be configured to prevent the first template card 120 from sliding beyond the top edge 102 and the bottom edge 104 of the template body 110. For example, the stops 126A may be configured to prevent the first template card 120 from sliding beyond the top edge 102. The stops 126B may be configured to prevent the first template card 120 from sliding beyond the bottom edge 104. The stops 136A, 136B may be configured to prevent the second template card 130 from sliding beyond the top edge 102 and the bottom edge 104 of the template body 110. For example, the stops 136A may be configured to prevent the second template card 130 from sliding beyond the top edge 102. The stops 136B may be configured to prevent the second template card 130 from sliding beyond the bottom edge 104.

The template body 110 may include a plurality of ribs 144 that extend from a rear surface 142 of the template body 110. The ribs 144 may be configured to provide structural support for the template body 110. The template body 110 may include a plurality of hollow pegs 140. Each of the ribs 144 may connect with one or more hollow pegs 140, the guide ring 117, and/or the rim 114. Each of the hollow pegs 140 may have a bore 141 that extends through the front surface 112 of the template body 110. The bores 141 may be sized to correspond to a pilot drill bit of a 67 mm and/or 68 mm hole saw. For example, each of the bores 141 may have a diameter of 6 mm or 7 mm. The center of each bore 141 may be positioned on the template body 110 at different distances from the guide ring 117. For example, the bore 141A may be a distance D1 from a vertical centerline 156 of the guide ring 117. The bore 141B may be a distance D2 from the vertical centerline 156. The bore 141C may be a distance D3 from the vertical centerline 156. The bore 141D may be a distance D4 from the vertical centerline 156. The bore 141E may be a distance D5 from the vertical centerline 156. The bore 141F may be a distance D6 from the vertical centerline 156. The bore 141G may be a distance D7 from the vertical centerline 156. The bore 141H may be a distance D8 form the vertical centerline 156.

The first template card 120 may be retained by a plurality of clips 118 that extend from the front surface 112 of the template body 110. The clips 118 may be L-shaped and may extend over the first template card 120. The clips 118 may be configured such that the first template card 120 can be slid along the front surface 112 between the top edge 102 and the bottom edge 104. Each of the openings 123 may be configured to engage one of the protrusions 122.

The first template card 120 may include a plurality of holes 150, 152, 154. The openings 123 that receive the protrusions 122 may be aligned with one or more of the plurality of holes 150, 152, 154. In addition, the notches 125 on each side of the first template card 120 may be aligned such that a pair of the notches 125 correspond to one or more of the plurality of holes 150, 152, 154 when the notches 125 are engaging the triangular wedges 124. For example, the first template card 120 may be moved (e.g., slid) from a bottom position 172 when a top pair of the openings 123 engage the respective protrusions 122 to a top position 178 when a bottom pair of the openings 123 engage the respective protrusions 122. The first template card 120 may include one or more intermediate positions 174, 176 between the top position 178 and the bottom position 172.

As shown in FIG. 1A, the clips 118, 128 are configured to constrain the first template card 120 and the second template card 130 to moving from the top edge 102 to the bottom edge 104 (e.g., vertically). Alternatively, the template body 110 may be configured to allow the first template card 120 and the second template card 130 to be slid along the front surface 112 in a direction parallel with the top edge 102 and bottom edge 104 (e.g., horizontally).

Each position of the first template card 120 may be associated with an electrical device configuration. For example, the bottom position 172 may be associated with a first configuration 182. The first configuration 182 may be a four-gang control device configuration (e.g., a four-gang keypad configuration). A first intermediate position 174 may be associated with a second configuration 184. The second configuration 184 may be a single-gang receptacle configuration. A second intermediate position 176 may be associated with a third configuration 186. The third configuration 186 may be a quadruple switch gang configuration. The top position 178 may be associated with a fourth configuration 188. The fourth configuration 188 may be a triple receptacle gang configuration.

When the first template card 120 is in the bottom position 172, the bore 141B may be accessible via the hole 154 of the first template card 120. When the first template card 120 is in the first intermediate position 174, none of the bores 141 may be accessible via the first template card 120. When the first template card 120 is in the second intermediate position 176, the bore 141C may be accessible via the hole 152 of the first template card 120. When the first template card 120 is in the top position 178, the bore 141A and the bore 141C may be accessible via the holes 150 of the first template card 120.

The second template card 130 may be retained by a plurality of clips 128 that extend from the front surface 112 of the template body 110. The clips 128 may be L-shaped and may extend over the second template card 130. The clips 128 may be configured such that the second template card 130 can be slid along the front surface 112 between the top edge 102 and the bottom edge 104. Each of the openings 133 may be configured to engage one of the protrusions 132.

The second template card 130 may include a plurality of holes 160, 162, 164, 166. The openings 133 that receive the protrusions 132 may with one or more of the plurality of holes 160, 162, 164, 166. For example, a pair of top openings 133 may correspond to hole 166. In addition, the notches 135 on each side of the second template card 130 may be aligned such that a pair of the notches 135 correspond to one or more of the plurality of holes 160, 162, 164,

166 when the notches 135 are engaging the triangular wedges 134. For example, the second template card 130 may be moved (e.g., slid) from a bottom position 173 when a top pair of the openings 133 engage the respective protrusions 132, as shown in FIG. 1F, to a top position 179 when a bottom pair of the openings 133 engage the respective protrusions 132. The second template card 130 may include one or more intermediate positions 175, 177 between the top position 179 and the bottom position 173.

Each position of the second template card 130 may be associated with an electrical device configuration. For example, the bottom position 173 may be associated with a first configuration 183. The first configuration 183 may be a single switch gang and/or a double switch gang configuration. A first intermediate position 175 may be associated with a second configuration 185. The second configuration 185 may be a triple switch gang configuration. A second intermediate position 177 may be associated with a third configuration 187. The third configuration 187 may be a quadruple switch gang configuration. The top position 179 may be associated with a fourth configuration 189. The fourth configuration 189 may be a double receptacle gang configuration.

When the second template card 130 is in the bottom position 173, bore 141E may be accessible via hole 166 of the second template card 130. When the second template card 130 is in the first intermediate position 175, bore 141D and bore 141F may be accessible via holes 164 of the second template card 130. When the second template card 130 is in the second intermediate position 177, bore 141E and bore 141H may be accessible via holes 162 of the second template card 130. When the second template card 130 is in the top position 179, bore 141E and bore 141G may be accessible via holes 160 of the second template card 130.

A first hole (e.g., a 67 mm or 68 mm diameter hole) may be drilled in a wall (e.g., by an electrical wall box installer) at a desired location for one or more wall boxes. The wall box installation tool 100 may be used to drill one or more pilot holes for the installation of one or more wall boxes in which electrical devices are to be installed. The wall box installation tool 100 may be installed in the wall. For example, the guide ring 117 of the wall box installation tool 100 may be inserted in the first hole drilled in the wall. The rim 114 of the wall box installation tool 100 may be flush with the wall when the wall box installation tool 100 is installed in the wall. The level 170 may be used to level the wall box installation tool 100. The wall box installation tool 100 may be adjusted to select a wall box configuration (e.g., as shown in FIG. 1G). For example, the first template card 120 and the second template card 130 may be moved into position based on the selected wall box configuration and/or electrical device configuration. When the wall box installation tool 100 has been adjusted, one or more of the bores 141 may be accessible via the front surface 112 of the wall box installation tool 100. For example, the bottom position 172 of the first template card 120 may be used to mark and/or drill a pilot hole through bore 141B. The wall box installation tool 100 may be removed from the wall and a second hole (e.g., a 67 mm or 68 mm diameter hole) may be drilled at the location of the pilot hole. Remaining wall material between the first hole and the second hole may be removed to create a wall opening. A wall box may be installed in the wall opening.

As shown in FIG. 1G, the position of the first template card 120 and the second template card 130 may correspond to various electrical device and/or electrical wall box configurations. For example, configuration A may correspond to configuration 182 (e.g., which may represent a four-gang keypad installation) when the first template card 120 is in the bottom position 172. Configuration B+E may correspond to configuration 184 (e.g., single-gang receptacle installation) for a first wall box and configuration 183A (e.g., a single-gang keypad installation) or configuration 183B (e.g., a double-gang keypad installation) for a second wall box. Configuration B+F may correspond to configuration 184 (e.g., a double-gang receptacle installation) for a first wall box and configuration 185 (e.g., a triple-gang keypad installation) for a second wall box. Configuration B+G may correspond to configuration 184 for a first wall box and configuration 187 for a second wall box. Configuration C+H may correspond to configuration 186 for a first wall box and configuration 189 for a second wall box. Configuration C+E may correspond to configuration 186 for a first wall box and configuration 183A or configuration 183B for a second wall box. Configuration C+F may correspond to configuration 186 for a first wall box and configuration 185 for a second wall box. Configuration C+G may correspond to configuration 186 for a first wall box and configuration 187 for a second wall box. Configuration D+H may correspond to configuration 188 for a first wall box and configuration 189 for a second wall box. Configuration D+E may correspond to configuration 188 for a first wall box and configuration 183A or configuration 183B for a second wall box. Configuration D+F may correspond to configuration 188 for a first wall box and configuration 185 for a second wall box. Configuration D+G may correspond to configuration 188 for a first wall box and configuration 187 for a second wall box.

Figure 2A:
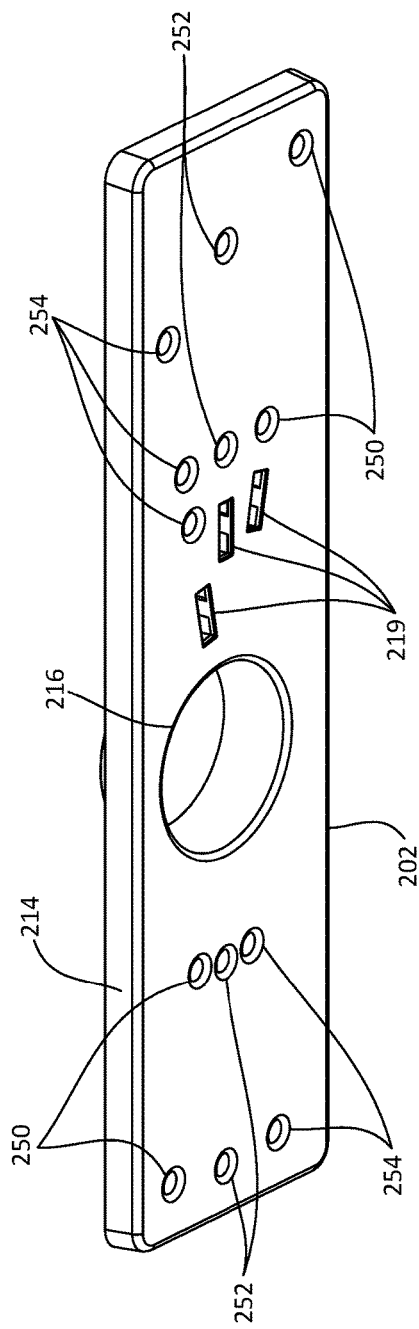
FIG. 2A is an example of another wall box installation tool.
Figure 2B:
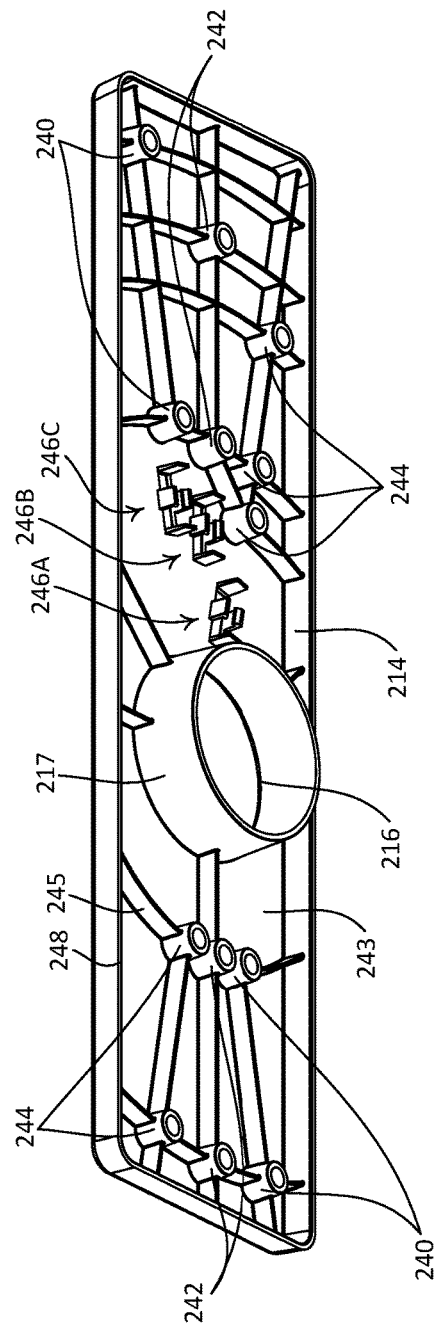
FIG. 2B is a rear view of the example wall box installation tool shown in FIG. 2A.

FIGS. 2A and 2B depict an example of another wall box installation tool 200. The wall box installation tool 200 may define a front surface 212, a rear surface 243, and a rim 214. The front surface 212 may have a rectangular shape. The rim 214 may extend at a perimeter of and perpendicular to the front surface 212. The wall box installation tool 200 may include a guide ring 217 that extends from the rear surface 243. The guide ring 217 may extend beyond a bottom edge 248 of the rim 214. The front surface 212 may define an opening 216. The opening 216 may be aligned with the guide ring 217 such that the opening 216 defines the inner diameter of the guide ring 217. The front surface 212 of the wall box installation tool 200 may include a plurality of pilot template holes 250, 252, 254. The front surface 212 may define a plurality of orifices 219. Each of the orifices 219 may be configured to receive a level (not shown) (e.g., a tubular spirit level such as the level 170 shown in FIG. 1F). The wall box installation tool 200 may include a plurality of fingers 246 that extend from the rear surface 243 of the wall box installation tool 200 at the edges of the orifices 219. The fingers 246 may be configured to secure a level within an orifice 219. The levels may be secured within the orifices 219 such that they can be read via the front surface 212.

The wall box installation tool 200 may include a plurality of ribs 245 that extend from a rear surface 243 of the wall box installation tool 200. The ribs 245 may be configured to provide structural support for the wall box installation tool 200. The wall box installation tool 200 may include a plurality of hollow pegs 240, 242, 244. Each of the ribs 245 may connect with one or more of the hollow pegs 240, 242, 244, the guide ring 217, and/or the rim 214. Each of the hollow pegs 240, 242, 244 may have a bore defined by the pilot template holes 250, 252, 254 on the front surface 212 of the wall box installation tool 200. For example, first pilot template holes 250 may be aligned with first hollow pegs 240; second pilot template holes 252 may be aligned with second hollow pegs 242; and third pilot template holes 254 may be aligned with third hollow pegs 244.

A first hole (e.g., a 68 mm diameter hole) may be drilled in a wall (e.g., by an electrical wall box installer) at a desired location for one or more wall boxes. The wall box installation tool 200 may be used to drill one or more pilot holes for the configuration of electrical devices that are to be installed in the one or more wall boxes. For example, the guide ring 217 of the wall box installation tool 200 may be inserted in the hole drilled in the wall. One of the levels (not shown) in the orifices 219 may be used to select a configuration. For example, a first level may correspond to the first pilot template holes 250 and the first hollow pegs 240 such that when the first level is level, the first pilot template holes 250 and the first hollow pegs 240 are horizontal. When the first level is level, the bottom edge 202 of the wall box installation tool 200 may not be parallel with the floor. A second level may correspond to the second pilot template holes 252 and the second hollow pegs 242 such that when the second level is level, the second pilot template holes 252 and the second hollow pegs 242 are horizontal. A third level may correspond to the third pilot template holes 254 and the third hollow pegs 244 such that when the third level is level, the third pilot template holes 254 and the third hollow pegs 244 are horizontal. When the third level is level, the bottom edge 202 of the wall box installation tool 200 may not be parallel with the floor.

When a level is selected to be level, one or more of the holes corresponding to the selected level may be marked and/or drilled based on an electrical device and/or electrical wall box configuration. For example, when the first level is selected, one or more of the first pilot template holes 250 may be selected to be drilled. The first level may be associated with various (e.g., six or more) electrical device configurations of receptacles and/or switches and the selected holes of the first pilot template holes 250 to be drilled may be based on a respective electrical device and/or wall box configuration.

FIGS. 3A-3H depict an example of another wall box installation tool 300. The example wall box installation tool 300 may allow for alignment and spacing of multiple adjacent wall boxes. The example wall box installation tool 300 may allow for the installation of non-standard wall boxes as well as locating and aligning multiple adjacent wall boxes. For example, the example wall box installation tool 300 may be used as a template for a desired wall box configuration and/or electrical device configuration. An electrical device configuration may include one or more standard and/or non-standard electrical devices installed in a single gang wall box, a multi-gang wall box, and/or multiple wall boxes. The example wall box installation tool 300 may allow for mounting of adjacent wall boxes for standard electrical devices, such as switches and receptacles, and non-standard electrical devices, such as a keypad of a load control system. The example wall box installation tool 300 may be used as a template to mark and/or drill one or more pilot holes for the installation of one or more wall boxes in which standard and/or non-standard electrical devices are to be installed.

The example wall box installation tool 300 may include a template body 310 and a template card 320. The template body 310 may define a front surface 312, a rear surface 342, and a rim 314. The front surface 312 may have a rectangular shape. The rim 314 may extend at a perimeter of and substantially perpendicular to the front surface 312. The template body 310 may include a guide ring 317 that extends from the rear surface 342 of the template body 310. The guide ring 317 may extend a distance D10 beyond a bottom edge 348 of the rim 314 (e.g., as shown in FIG. 3D). The guide ring 317 may be sized to correspond to a standard wall box size and/or a standard hole saw. For example, the guide ring 317 may have an outer diameter of 67 mm or 68 mm. Although the guide ring 317 is depicted as having a circular shape, the guide ring 317 may be square-shaped or rectangular-shaped.

The example wall box installation tool 300 may include one or more fasteners 355. The fasteners 355 may be configured to retain the template card 320 on the front surface 312 of the template body 310. For example, the template card 320 may define one or more holes 354 therethrough. The holes 354 may correspond to bores 323 in the template body 310. The holes 354 and the bores 323 may be configured to receive the fasteners 355. The holes 354 may be slotted, for example, to allow for tolerances. The holes 354 may be slotted to allow for the fasteners 355 to remain installed (e.g., partially installed) within the bores 323 before installing the template card 320. For example, the fasteners 355 may be aligned with a wider portion of the holes 354 when installing the template card 320 on the template body 310. The template card 320 may be configured to slide downward such that a narrow portion of the holes 354 surround the fasteners 355. The fasteners 355 may be tightened such that the narrow portions of the respective holes 354 engages the fasteners 355 when the template card 320 is installed.

The template body 310 may include a plurality of ribs 344 that extend from a rear surface 342 of the template body 310. The ribs 344 may be configured to provide structural support for the template body 310. The template body 310 may include a plurality of hollow pegs 340, 322. Each of the ribs 344 may connect with one or more hollow pegs 340, 322, the guide ring 317, and/or the rim 314. Each of the hollow pegs 340 may have a bore 341 that extends through the front surface 312 of the template body 310. The bores 341 may be sized to correspond to a pilot drill bit of a 67 mm and/or 68 mm hole saw. For example, each of the bores 341 may have a diameter of 6 mm or 7 mm. Each of the hollow pegs 322 may have a bore 323 that extends through the front surface 312 of the template body 310.

The template card 320 may define a plurality of holes 350. Each of the holes 350 may be configured such that a corresponding one of the bores 341 may be accessible via the hole 350 of the template card 320. The template card 320 may define a slot 352 configured such that the level 370 is visible when the template card 320 is installed on the template body 310.

Figure 3A:
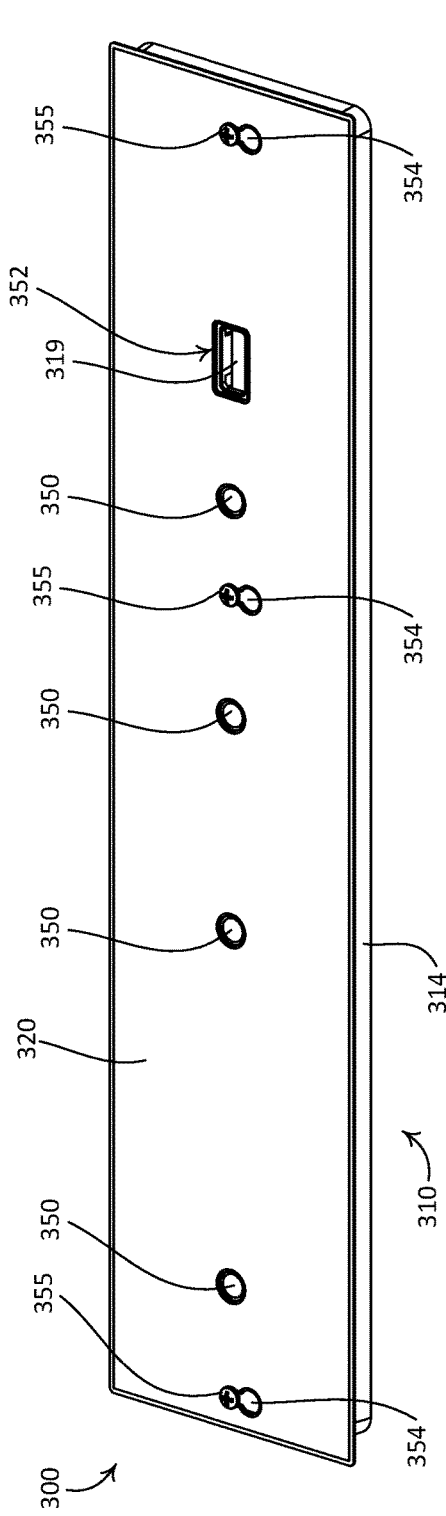
FIG. 3A is an example of another wall box installation tool.
Figure 3B:
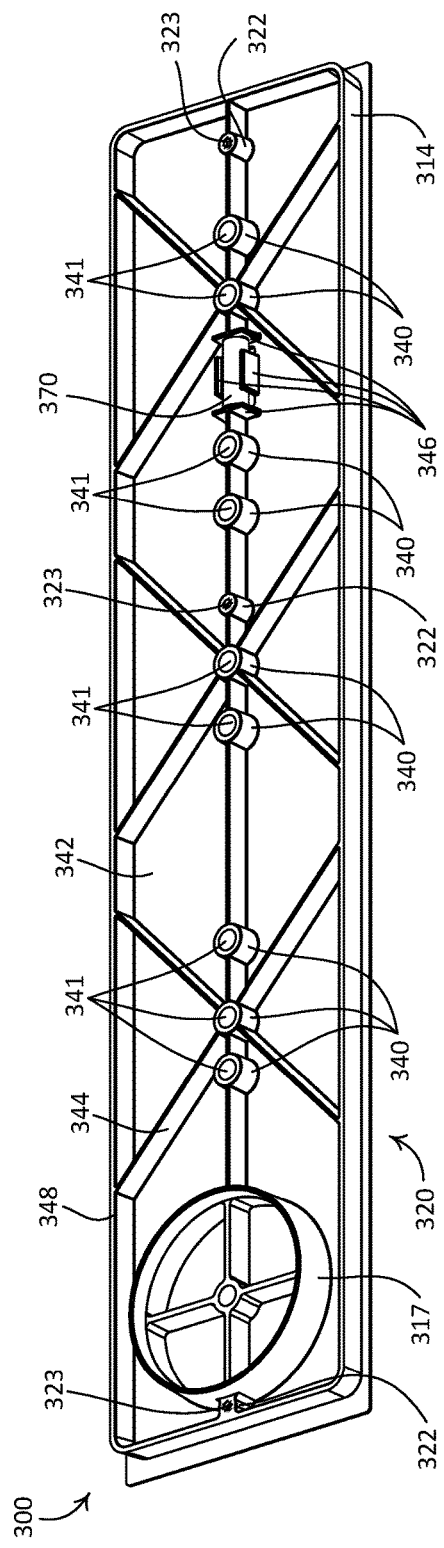
FIG. 3B is a rear view of the example wall box installation tool shown in FIG. 3A.
Figure 3C:
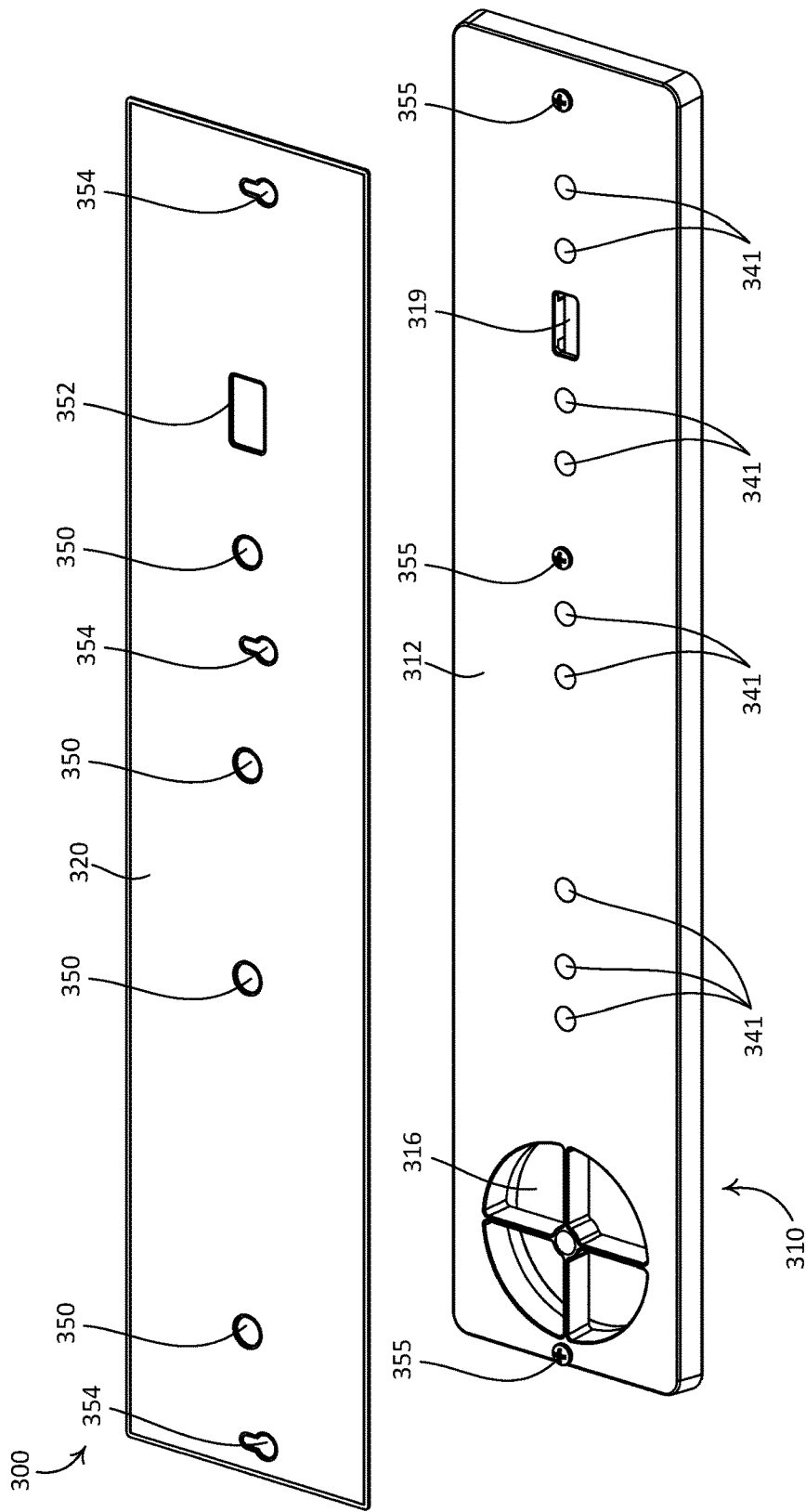
FIG. 3C is an exploded view of the example wall box installation tool shown in FIG. 3A.

As shown in FIG. 3C, the front surface 312 may define an opening 316. The opening 316 may be aligned with the guide ring 317 such that the opening 316 defines the inner diameter of the guide ring 317. The front surface 312 may define an orifice 319. The orifice 319 may be configured to receive a level 370 (e.g., such as a tubular spirit level). The front surface 312 may define one or more additional orifices that are configured to accept one or more additional levels. For example, the front surface 312 may define an orifice to receive an additional level that is oriented perpendicular to the level 370. The template body 310 may include a plurality of fingers 346 that extend from the rear surface 342 of the template body 310 at the edges of the orifice 319. The fingers 346 may be configured to secure the level 370 within the orifice 319. The level 370 may be secured within the orifice 319 such that it can be read via the front surface 312.

Figure 3F:
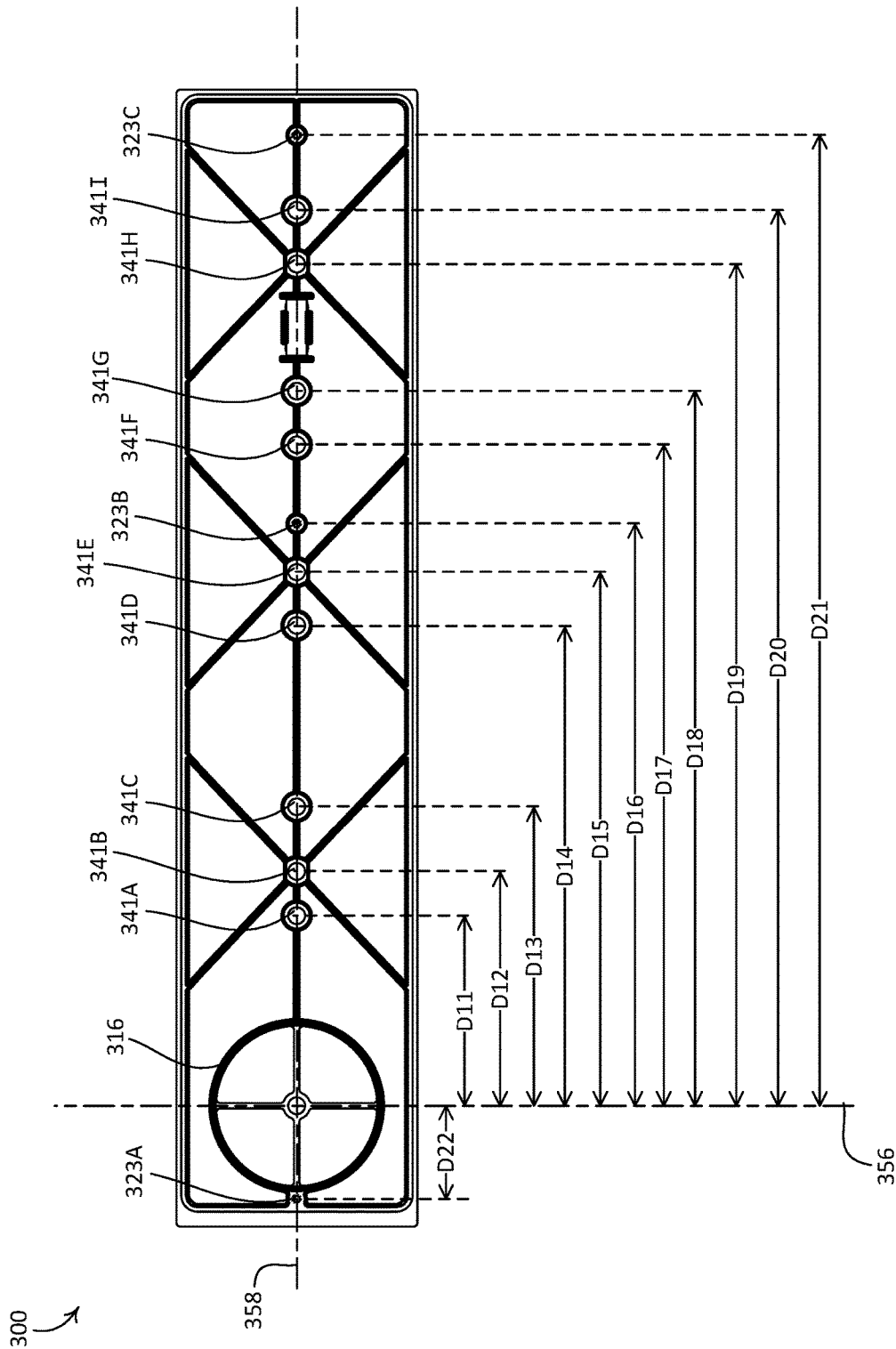
FIG. 3F is a rear view of the example wall box installation tool of FIG. 3A.

As shown in FIG. 3F, each of the bores 341, 321 (e.g., and respective hollow pegs 340, 322) may be positioned along a horizontal centerline 358 of the guide ring 317. The center of each bore 341, 323 may be positioned on the template body 310 at different distances from the guide ring 317. For example, the bore 341A may be a distance D11 from a vertical centerline 356 of the guide ring 317. The bore 341B may be a distance D12 from the vertical centerline 356. The bore 341C may be a distance D13 from the vertical centerline 356. The bore 341D may be a distance D14 from the vertical centerline 356. The bore 341E may be a distance D15 from the vertical centerline 356. The bore 341F may be a distance D17 from the vertical centerline 356. The bore 341G may be a distance D18 from the vertical centerline 356. The bore 341H may be a distance D19 form the vertical centerline 356. The bore 341I may be a distance D20 from the vertical centerline 356. The bore 323A may be a distance D22 from the vertical centerline 356. The bore 323B may be a distance D16 from the vertical centerline 356. The bore 323C may be a distance D21 from the vertical centerline 356.

Figure 3G:
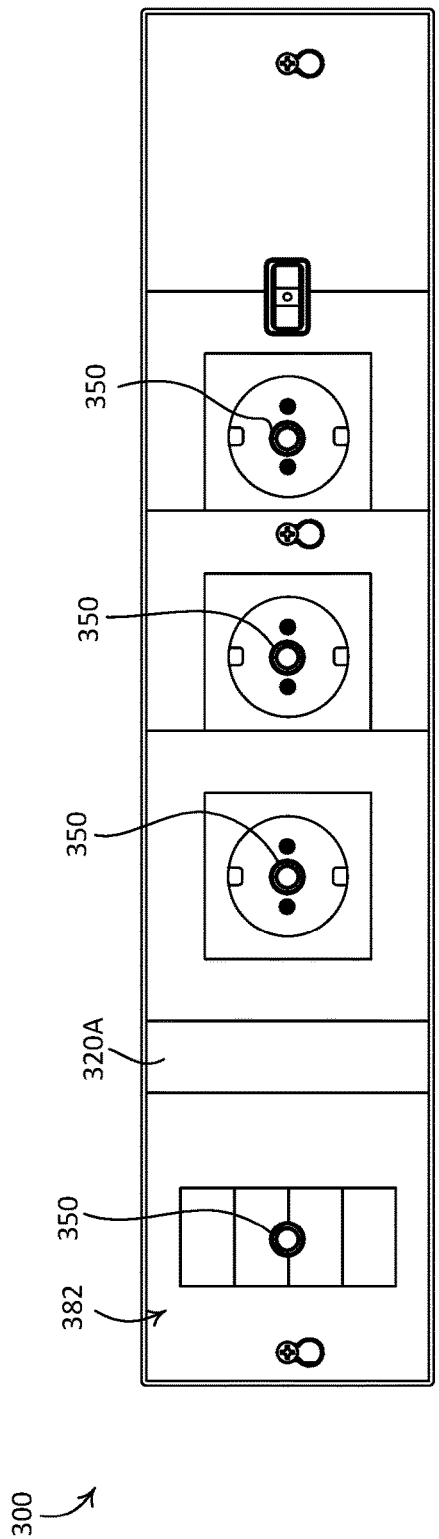
FIGS. 3G and 3H are front views of the example wall box installation tool of FIG. 3A showing example template card details.

The template body 310 may be configured to receive one of a plurality of template cards. Each of the plurality of template cards may be associated with a respective electrical device configuration. For example, the template card 320A, as shown in FIG. 3G, may be associated with a first electrical device configuration 382. The first electrical device configuration 382 may be a control device having a single column of buttons (e.g., a single-column keypad) that may be installed next to a multiple-gang receptacle configuration (e.g., a single-gang, a double-gang, or a triple-gang receptacle configuration). The template card 320B may be associated with a second configuration 384. The second configuration 384 may be a control device having four columns of buttons (e.g., a four-column keypad) that may be installed next to a multiple-gang receptacle configuration (e.g., a single-gang, a double-gang, or a triple-gang receptacle configuration). Other template cards may be provided for other electrical device configurations, e.g., single receptacles, double-column keypads, and triple-column keypads.

A subset of the bores 341 may be accessible via the template card 320 when one of the template cards is installed on the front surface 312 of the template body 310. One or more of the bores 341 may be covered by the template card 320 such that the one or more bores are inaccessible via the template card when the template card is installed on the front surface 312 of the template body 310. For example, a first subset of the bores 341 may be accessible via the template card 320A and a second subset of the bores 341 may be accessible via the template card 320B. A number of the plurality of holes 350 of each template card 320, 320A, 320B may be less than a number of the plurality of bores 341 of the template body 310.

Figure 3H:
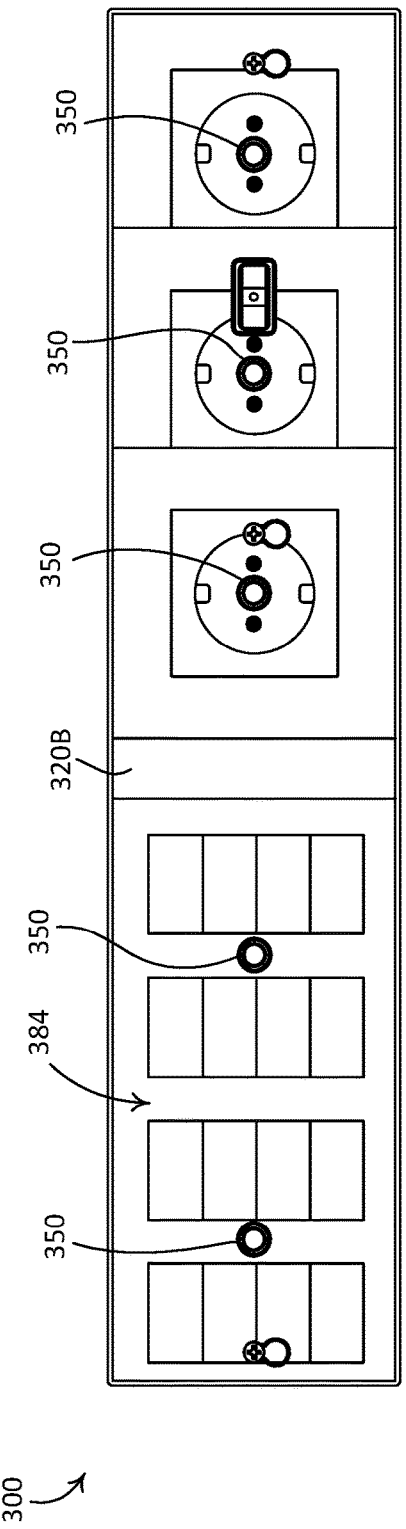

A first hole (e.g., a 67 mm or 68 mm diameter hole) may be drilled in a wall (e.g., by an electrical wall box installer) at a desired location for one or more wall boxes. The template body 310 of the wall box installation tool 300 may be used to drill one or more pilot holes for the installation of one or more wall boxes in which electrical devices are to be installed. The template body 310 may be installed in the wall. For example, the guide ring 317 of the template body 310 may be inserted in the first hole drilled in the wall. The rim 314 of the template body 310 may be flush with the wall when the template body 310 is installed in the wall. The level 370 may be used to level the template body 310. The wall box installation tool 300 may be adjusted to select a wall box configuration (e.g., as shown in FIGS. 3G and 3H). For example, one of a plurality of template cards 320 may be installed on the template body 310 based on a selected wall box configuration and/or electrical device configuration. The template cards 320A, 320B may be used to mark and/or drill a plurality of pilot holes through the bores 341, as shown in FIG. 3C. The wall box installation tool 300 may be removed from the wall and additional holes (e.g., a 67 mm or 68 mm diameter holes) may be drilled at the location of the pilot holes. Remaining wall material between one or more of the pilot holes may be removed to create a wall opening. One or more wall boxes may be installed in the wall opening.

The invention claimed is:

1. A wall box installation tool, comprising:
a template body having a front surface, a guide ring that extends from a rear surface of the template body, and a plurality of bores that extend through the template body from the front surface to the rear surface; and
a first template card located on the front surface of the template body and having a first plurality of holes;
wherein the guide ring is configured to be installed within a pre-drilled hole in a wall, and wherein the first template card is configured to move from a first position associated with a first electrical device configuration to a second position associated with a second electrical device configuration, and wherein a first subset of the plurality of bores in the template body are accessible via the first template card in the first position, and wherein a second subset of the plurality of bores in the template body are accessible via the first template card in the second position.

2. The wall box installation tool of claim 1, wherein the first template card is configured to be slid along the front surface of the template body between the first position and the second position.

3. The wall box installation tool of claim 2, wherein the template body includes a plurality of clips that are configured to retain the template card on the front surface of the template body.

4. The wall box installation tool of claim 3, wherein the template body includes a plurality of stops that are configured to prevent the template card from sliding beyond a top edge and a bottom edge of the template body.

5. The wall box installation tool of claim 2, wherein the template body defines a plurality of protrusions that extend from the front surface of the template body, and the first template card includes a plurality of openings configured to engage the plurality of protrusions and hold the first template card in a selected position.

6. The wall box installation tool of claim 2, wherein the template body defines a plurality of triangular wedges that extend from the front surface of the template body, and the first template card includes a plurality of notches configured to engage the plurality of triangular wedges and hold the first template card in a selected position.

7. The wall box installation tool of claim 1, further comprising:
a second template card located on the front surface of the template body and having a second plurality of holes, the second template card configured to move from a third position to a fourth position;
wherein a third subset of the plurality of bores in the template body are accessible via the second template card in the third position, and wherein a fourth subset of the plurality bores in the template body are accessible via the second template card in the fourth position.

8. The wall box installation tool of claim 7, wherein a fifth subset of the plurality of bores is accessible via the first and second template cards when the first template card is in the first position and the second template card is in the second position.

9. The wall box installation tool of claim 1, wherein the first subset of the plurality of bores are accessed through a subset of the first and second plurality of holes in the first and second template cards.

10. The wall box installation tool of claim 1, wherein the template body comprises a rim that extends at a perimeter of and substantially perpendicular to the front surface, and the guide ring extends beyond the rim.

11. A wall box installation tool, comprising:
a template body having a guide ring and a plurality of bores that extend through the template body, wherein the guide ring extends from a rear surface of the template body and is configured to be installed within a pre-drilled hole in a wall; and
a plurality of levels that are positioned at oblique angles on the template body, wherein a first subset of the bores are aligned with a first level of the plurality of levels such that the first subset of the bores are horizontal when the first level is level, and wherein a second subset of the bores are aligned with a second level of the plurality of levels such that the second subset of the bores are horizontal when the second level is level.

12. The wall box installation tool of claim 11, wherein the template body includes a front surface and a rim that extends at a perimeter of and substantially perpendicular to the front surface.

13. The wall box installation tool of claim 12, wherein the front surface of the template body defines a plurality of orifices configured to retain the plurality of levels.

14. The wall box installation tool of claim 12, wherein the guide ring extends beyond the rim.

15. A wall box installation tool, comprising:
a template body having a front surface, a guide ring that extends from a rear surface of the template body, and a plurality of bores that extend through the template body from the front surface to the rear surface; and
a template card configured to be installed on the front surface of the template body, wherein the template card defines a plurality of holes therethrough;
wherein the guide ring is configured to be installed within a pre-drilled hole in a wall, and wherein the template card is associated with an electrical device configuration, and wherein a subset of the plurality of bores in the template body are accessible via the plurality of holes of the template card when the template card is installed on the front surface of the template body.

16. The wall box installation tool of claim 15, wherein the electrical device configuration is a first electrical device configuration, and the template card is configured to move from a first position associated with the first electrical device configuration to a second position associated with a second electrical device configuration, and wherein a first subset of the plurality of bores in the template body are accessible via the template card in the first position, and wherein a second subset of the plurality of bores in the template body are accessible via the template card in the second position.

17. The wall box installation tool of claim 16, wherein the template body includes a plurality of clips that are configured to retain the template card on the front surface of the template body, and the template card is configured to be slid along the front surface of the template body between the first position and the second position.

18. The wall box installation tool of claim 17, wherein the template body defines a plurality of protrusions that extend from a front surface of the template body, and are configured to engage the template card to hold the template card in a selected position.

19. The wall box installation tool of claim 15, further comprising:
one or more fasteners that are configured to install the template card onto the front surface of the template body.

20. The wall box installation tool of claim 15, wherein the template card is a first template card, the electrical device configuration is a first electrical device configuration, and the subset of the plurality of bores is a first subset of the plurality of bores, and wherein the wall box installation tool further comprises a second template card configured to be installed on the front surface of the template body, and wherein the second template card is associated with a second electrical device configuration, and wherein a second subset of the plurality of bores is accessible via the second template card when the second template card is installed on the front surface of the template body.

21. The wall box installation tool of claim 15, wherein the template card is configured to cover one or more of the plurality of bores not in the subset of bores such that the one or more of the plurality of bores are inaccessible via the template card when the template card is installed on the front surface of the template body.

22. The wall box installation tool of claim 15, wherein a number of the plurality of holes of the template card is less than a number of the plurality of bores of the template body.

23. The wall box installation tool of claim 15, further comprising:
a level that is retained within an orifice of the template body.

24. The wall box installation tool of claim 15, wherein the template body comprises a rim that extends at a perimeter of and substantially perpendicular to the front surface, and the guide ring extends beyond the rim.

25. The wall box installation tool of claim 15, wherein the plurality of bores of the template body are formed in respective hollow pegs that extend from the rear surface of the template body.

* * * * *